United States Patent
Haishi et al.

(10) Patent No.: US 12,159,998 B2
(45) Date of Patent: Dec. 3, 2024

(54) ELECTRODE AND ELECTROCHEMICAL MEASUREMENT SYSTEM

(71) Applicants: NITTO DENKO CORPORATION, Ibaraki (JP); National Institute of Advanced Industrial Science and Technology, Tokyo (JP)

(72) Inventors: Motoki Haishi, Ibaraki (JP); Mitsunobu Takemoto, Ibaraki (JP); Tatsuya Kitahara, Ibaraki (JP); Kentaro Takeda, Ibaraki (JP); Dai Kato, Tsukuba (JP); Tomoyuki Kamata, Tsukuba (JP)

(73) Assignees: NITTO DENKO CORPORATION, Ibaraki (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 540 days.

(21) Appl. No.: 17/434,540

(22) PCT Filed: Feb. 25, 2020

(86) PCT No.: PCT/JP2020/007470
§ 371 (c)(1),
(2) Date: Aug. 27, 2021

(87) PCT Pub. No.: WO2020/175471
PCT Pub. Date: Sep. 3, 2020

(65) Prior Publication Data
US 2022/0140341 A1    May 5, 2022

(30) Foreign Application Priority Data

Feb. 28, 2019 (JP) .................. 2019-036301
Feb. 19, 2020 (JP) .................. 2020-026156

(51) Int. Cl.
*G01N 27/30* (2006.01)
*H01M 4/583* (2010.01)

(52) U.S. Cl.
CPC .......... *H01M 4/583* (2013.01); *G01N 27/308* (2013.01)

(58) Field of Classification Search
CPC ............................ G01N 27/308; H01M 4/583
See application file for complete search history.

(56) References Cited

FOREIGN PATENT DOCUMENTS

| CN | 104280435 A | 1/2015 |
| CN | 108630891 A | 10/2018 |

(Continued)

OTHER PUBLICATIONS

Sainio et al., "Correlation between sp3-to-sp2 Ration and Surface Oxygen Functionalities in Tetrahedral Amorphous Carbon (ta-C) Thin Film Electrodes and Implications of Their Electrochemical Properties," J. Phys. Chem. C 2016, 120, 8298-8304 along with Supporting Information (Year: 2016).*

(Continued)

*Primary Examiner* — Alexander S Noguerola
(74) *Attorney, Agent, or Firm* — Hauptman Ham, LLP

(57) ABSTRACT

A carbon electrode includes a substrate, and a conductive carbon layer disposed at an upper side of the substrate and having an $sp^2$ bond and an $sp^3$ bond. On an upper surface of the conductive carbon layer, the concentration ratio of oxygen to carbon is 0.07 or more. The ratio of a number of $sp^3$ bonded carbon atoms to the sum of a number of $sp^2$ bonded carbon atoms and the number of $sp^3$ bonded carbon atoms is 0.35 or more.

5 Claims, 2 Drawing Sheets

(56) References Cited

FOREIGN PATENT DOCUMENTS

| JP | 2005-351677 A | 12/2005 |
|----|---------------|---------|
| JP | 2006-90875 A | 4/2006 |
| JP | 2013-200260 A | 10/2013 |
| JP | 2018-155728 A | 10/2018 |
| WO | 2010/004690 A1 | 1/2010 |

OTHER PUBLICATIONS

Laurila et al., "Multi-walled carobn nanotubes 9MWCNTs) grown directly on tetrahedral amorphous carbon (ta-C): An interfacial study," Diamond & Related Materials 56 (2015) 54-59 (Year: 2015).*

Laurila et al., "New electrochemically improved tetrahedral amorphous carbon films for biological applications," Diamond & Related Materials 49 (2014) 62-71 (Year: 2014).*

Notification Concerning Transmittal of International Preliminary Report on Patentability (PCT/IB/326) along with International Preliminary Report on Patentability issued for corresponding International Patent Application No. PCT/JP2020/007470 on Sep. 10, 2021.

Notification of Transmittal of Translation of the International Preliminary Report on Patentability (PCT/IB/338) along with International Preliminary Report on Patentability issued for corresponding International Patent Application No. PCT/JP2020/007470 on Sep. 10, 2021, correspond to an English translation of NPL No. 1.

Yanagisawa et al., "Effect of the sp2/sp3 Ratio in a Hybrid Nanocarbon Thin Film Electrode for Anodic Stripping Voltammetry Fabricated by Unbalanced Magnetron Sputtering Equipment", Analytical Sciences, Jul. 2015, vol. 31, pp. 635-641 (7 pages).

Office Action issued on Aug. 4, 2023 for corresponding Chinese Patent Application No. 202080016483.8, along with an English machine translation (16 pages).

Rusop et al., "X-ray photoelectron spectroscopy studies on the bonding properties of oxygenated amorphous carbon nitride thin films synthesized by pulsed laser deposition at different substrate temperatures", Journal of Non-Crystalline Solids, vol. 351, Nos. 49-51, Dec. 1, 2005, pp. 3738-3746 (9 pages), cited in NPL No. 1.

Kovtun et al., "Accurate chemical analysis of oxygenated graphene-based materials using X-ray photoelectron spectroscopy", Carbon, vol. 143, Mar. 2019, pp. 268-275 (8 pages), cited in NPL No. 1.

Examination Report issued on Jan. 27, 2023 for corresponding Indian Patent Application No. 202117038527 (6 pages).

The Extended European Search Report issued on Oct. 11, 2022 for European Patent Application No. 20763408.0 (7 pages).

Jia et al., "Structure and Electrochemical Properties of Carbon Films Prepared by a Electron Cyclotron Resonance Sputtering Method", Analytical Chemistry, vol. 79, No. 1, Jan. 1, 2007, pp. 98-105 (8 pages), cited in NPL No. 1.

Kamata et al., "Structure and electrochemical characterization of carbon films formed by unbalanced magnetron (UBM) sputtering method", Diamond & Related Materials, vol. 49, Aug. 1, 2014, pp. 25-32 (8 pages), cited in NPL No. 1.

International Search Report issued for corresponding International Patent Application No. PCT/JP2020/007470 on Apr. 7, 2020, along with an English translation.

Written Opinion issued for corresponding International Patent Application No. PCT/JP2020/007470 on Apr. 7, 2020.

Office Action issued for Japanese Patent Application No. 2020-026156 on Jun. 23, 2021, along with an English machine translation.

Kato et al., "Evaluation of Electrokinetic Parameters for All DNA Bases with Sputter Deposited Nanocarbon Film Electrode", Analytical Chemistry, 2012, vol. 84, pp. 10607-10613, cited in NPL Nos. 1, 2 & 3.

Kato et al., "Nanocarbon Film Electrodes Can Expand the Possibility of Electroanalysis", Bunseki Kagaku, 2018, vol. 67, No. 11, pp. 635-645, along with an English Abstract, cited in NPL Nos. 1, 2 & 3.

Zeng et al., "Diamondlike carbon (DLC) films as electrochemical electrodes", Diamond & Related Materials, 2004, vol. 43, pp. 12-22, cited in NPL Nos. 1, 2 & 3.

Communication pursuant to Article 94(3) EPC issued on Oct. 8, 2024 for corresponding European Patent Application No. 20 763 408.0 (5 pages).

Sekioka et al., "Controllabel electode activities of nano-carbon films maintaining surface flatness by electrochemical pretreatment", Carbon, vol. 46, No. 14, Nov. 2008, pp. 1918-1926 (9 pages), cited in NPL No. 1.

* cited by examiner

ELECTRODE AND ELECTROCHEMICAL MEASUREMENT SYSTEM

CROSS REFERENCE TO RELATED APPLICATION

This application is a National Stage of International Application No. PCT/JP2020/007470, filed on Feb. 25, 2020, which designates the United States and was published in Japan, and which is based upon and claims priority to Japanese Patent Application Nos. 1) 2019-036301, filed on Feb. 28, 2019; and 2) 2020-026156, filed on Feb. 19, 2020 in the Japan Patent Office. All of the aforementioned applications are hereby incorporated by reference in their entireties.

The present invention relates to an electrode, and an electrochemical measurement system including the electrode.

TECHNICAL FIELD

There is a known electrochemical measurement method using an electrochemical reaction to carry out a qualitative analysis or a quantitative analysis of a trace amount of ions or residues in a solution. Examples of the electrochemical measurement method include a method of measuring the potential difference in a vessel and a method of measuring the current.

BACKGROUND ART

The electrochemical measurement system used for the electrochemical measurement method generally includes at least a working electrode and a reference electrode (or a counter electrode), and the object to be measured is detected at the working electrode. As the working electrode, for example, platinum, gold, glassy carbon, a boron-doped diamond are used. However, the noble metals such as platinum are scarce, and to produce glassy carbon and boron-doped diamonds require production at a very high temperatures.

In light of the foregoing, it has been considered to use a carbon electrode including a domain of $sp^2$ bonded and spa bonded microcrystals as a working electrode (See Patent Document 1).

A film of the carbon electrode of Patent Document 1 can easily be produced at a relatively low temperature, and thus does not require a production facility for a high temperature process. In addition, the carbon electrode has a wide potential window, and thus can detect a variety of substances.

CITATION LIST

Patent Document

Patent Document 1: Japanese Unexamined Patent Publication No. 2006-90875

SUMMARY OF THE INVENTION

Problem to be Solved by the Invention

The wider the range of the potential window is, the more the variety of the substances to be detected is. Thus, the convenience is improved. Particularly, at high potential for anodic direction in the range of the potential window, for example, substances derived from RNA can be detected. Thus, the further extension of the potential window for anodic direction is anticipated.

The present invention provides an electrode and an electrochemical measurement system with a potential window extended for anodic direction.

Means for Solving the Problem

The present invention [1] includes an electrode comprising: a substrate; and a conductive carbon layer disposed at one side in a thickness direction of the substrate and having an $sp^2$ bond and an $sp^3$ bond, wherein a concentration ratio of oxygen to carbon is 0.07 or more on a one-side surface in the thickness direction of the conductive carbon layer, and a ratio of a number of $sp^3$ bonded carbon atoms to a sum of a number of $sp^2$ bonded carbon atoms and the number of $sp^3$ bonded carbon atoms is 0.35 or more.

The present invention [2] includes the electrode described in [1] above, wherein the conductive carbon layer has a thickness of 5 nm or more and 200 nm or less.

The present invention [3] includes the electrode described in [1] or [2] above, wherein the one-side surface in the thickness direction of the conductive carbon layer has a surface roughness Ra of 1.0 nm or less.

The present invention [4] includes the electrode described in any one of the above-described [1] to [3], being an electrode for an electrochemical measurement.

The present invention [5] includes an electrochemical measurement system comprising the electrode described in [4] above.

Effects of the Invention

In the electrode and electrochemical measurement system of the present invention, on the one-side surface in the thickness direction of the conductive carbon layer, the concentration ratio of oxygen to carbon is 0.07 or more, and the ratio of the number of $sp^3$ bonded atoms to the sum of the number of $sp^2$ bonded atoms and the number of $sp^3$ bonded atoms is 0.35 or more. Thus, the potential window for anodic direction is extended. Accordingly, substances that are detected with high potential can be detected.

DESCRIPTION OF THE EMBODIMENTS

Figure 1:
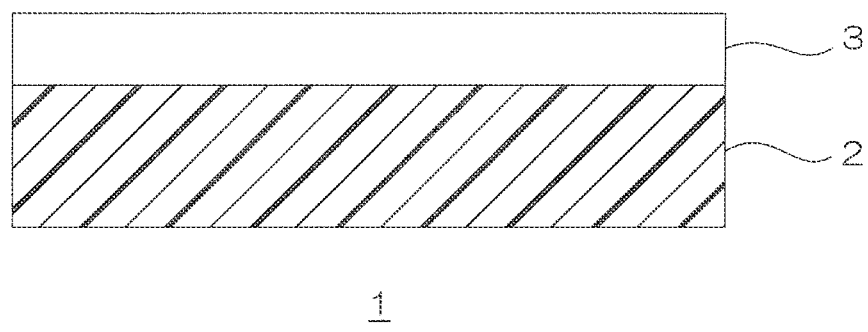
FIG. 1 is a cross-sectional view of an embodiment of the electrode of the present invention.

With reference to FIG. 1, a carbon electrode that is an embodiment of the electrode of the present invention will be described. In FIG. 1, the upper-lower direction of the paper sheet of the drawing is the upper-lower direction (the thickness direction, and the first direction). The upper side of the paper sheet is the upper side (the one side in the thickness direction, the one side in the first direction). The lower side of the paper sheet is the lower side (the other side in the thickness direction, the other side in the first direction).

Meanwhile, the left-right direction and depth direction of the paper sheet are surface directions orthogonal to the upper-lower direction. Specifically, the directions conform to the direction arrows in each drawing.

1. Carbon Electrode

A carbon electrode 1 has a film shape (including a sheet shape) with a predetermined thickness, extends in a predetermined direction (surface direction) orthogonal to the thickness direction, and has a flat upper surface (a one-side surface in the thickness direction) and a flat lower surface (the other-side surface in the thickness direction).

Specifically, as illustrated in FIG. 1, the carbon electrode 1 includes a substrate 2, and a conductive carbon layer 3 disposed at an upper side (the one side in the thickness direction) of the substrate 2. In other words, the carbon electrode 1 includes the substrate 2, and the conductive carbon layer 3 in the thickness direction. Preferably, the carbon electrode 1 consists of the substrate 2 and the conductive carbon layer 3. Hereinafter, each of the layers will be described in detail.

2. Substrate

The substrate 2 is a substrate that supports the conductive carbon layer 3. The substrate 2 is the lowest layer of the carbon electrode 1, and disposed on an entire lower surface of the conductive carbon layer 3 so as to be in contact with a lower surface of the conductive carbon layer 3.

Examples of the substrate 2 include an inorganic substrate and an organic substrate.

Examples of the inorganic substrate include a silicon substrate and a glass substrate.

Examples of the organic substrate include polymer films. Examples of the material of the polymer film include polyester resins (such as polyethylene terephthalate, and polyethylene naphthalate), acetate resins, polyether sulfone resins, polycarbonate resins, polyamide resins, polyimide resins, polyolefin resins (such as polycycloolefin polymers), (meth)acrylic resins, polyvinyl chloride resins, polyvinylidene chloride resins, polystyrene resins, polyvinyl alcohol resins, polyarylate resins, and polyphenylenesulfide resins.

The substrate has a thickness of, for example, 2 μm or more, preferably 20 μm or more and, for example, 1000 μm or less, preferably 500 μm or less.

3. Conductive Carbon Layer

The conductive carbon layer 3 is a layer that has electrode properties (such as a width of the potential window, and conductivity) and functions as an electrode.

The conductive carbon layer 3 is formed of carbon having an $sp^2$ bond and an $sp^3$ bond. In other words, the conductive carbon layer 3 is a layer having a graphite structure and a diamond structure. In this manner, the conductive carbon layer 3 extends its potential window, and has good conductivity. Further, the conductive carbon layer 3 has excellent film-forming properties at a low temperature.

The ratio $(sp^3/sp^3+sp^2)$ of the number of $sp^3$ bonded atoms to the sum of the number of $sp^3$ bonded atoms and the number of $sp^2$ bonded atoms is, for example, 0.1 or more, preferably 0.2 or more, more preferably 0.25 or more, even more preferably 0.30 or more, particularly preferably 0.35 or more, particularly preferably 0.40 or more, particularly preferably 0.50 or more. Meanwhile, the ratio $(sp^3/sp^3+sp^2)$ of the number of $sp^3$ bonded atoms to the sum of the number of $sp^3$ bonded atoms and the number of $sp^2$ bonded atoms is, for example, 0.9 or less, preferably 0.5 or less.

Where the ratio $(sp^3/sp^3+sp^2)$ of the number of $sp^3$ bonded atoms is the above-described lower limit or more, the potential window of the carbon electrode 1 can be further extended for anodic direction when the concentration ratio (O/C) of oxygen to carbon is set in the range. In other words, where the ratio $(sp^3/sp^3+sp^2)$ of the number of $sp^3$ bonded atoms is less than the above-described lower limit, the potential window of the carbon electrode 1 cannot further be extended for anodic direction even when the concentration ratio (O/C) of oxygen to carbon is set in the range.

To be more specific, there is a plurality of samples at the same ratio $(sp^3/sp^3+sp^2)$ of the number of $sp^3$ bonded atoms. The concentration ratio (O/C) of oxygen is 0.07 or more in a first sample, and the concentration ratio (O/C) of oxygen is less than 0.07 in a second sample. The potential window of the first sample for anodic direction is compared with the potential window of the second sample for anodic direction. As a result, the potential window of the first sample for anodic direction is wider than that of the second sample.

On the other hand, when the ratio $(sp^3/sp^3+sp^2)$ of the number of $sp^3$ bonded atoms is the above-described upper limit or less, the conductivity of the conductive carbon layer 3 decreases and the current signal becomes smaller. Thus, it is sometimes difficult to detect especially the signals in the low concentration region.

The above-described ratio can be calculated based on the peak intensity of the $sp^2$ bond and the peak intensity of $sp^3$ bond in the spectrum obtained by measuring the upper surface of the conductive carbon layer 3 with X-ray photoelectron spectroscopy. The specific calculation will be described below in Examples.

On the upper surface of the conductive carbon layer 3, the concentration ratio (O/C) of oxygen to carbon is, 0.07 or more, preferably 0.08 or more, more preferably 0.09 or more, particularly preferably 0.10 or more. When the above-described concentration ratio is the above-described lower limit or more, the potential window of the carbon electrode 1 can be extended for anodic direction. Thus more compounds can be detected.

The upper limit of the above-described concentration ratio is not limited. However, to maintain the shape of the solid surface, the concentration ratio is, for example, 0.20 or less, preferably 0.15 or less.

The above-described concentration ratio can be calculated based on the peak intensity of C1s and the peak intensity of O1s in the spectrum obtained by measuring the upper surface of the conductive carbon layer 3 with X-ray photoelectron spectroscopy. The specific calculation will be described below in Examples.

The upper surface of the conductive carbon layer 3 has a surface roughness Ra of, for example, 10 nm or less, preferably 5 nm or less, preferably 3 nm or less, preferably 1.0 nm or less, the most preferably 0.9 nm or less (or less than 1.0 nm). Meanwhile, the upper surface of the conductive carbon layer 3 has a surface roughness Ra of, for example, 0.01 nm or more, or 0.05 nm or more.

Where the surface roughness Ra is less than the above-described upper limit, the noise of the current can be suppressed when the carbon electrode 1 is used as an electrode for an electrochemical measurement. Further, even when the concentration of the analytes to be measured is low, the response current can be detected without being buried in the background current. Thus, a measurement (electrochemical measurement) with good sensitivity can be carried out.

The surface roughness Ra of the upper surface of the conductive carbon layer 3 can be measured by the observation of a 500 nm square of the upper surface of the conductive carbon layer 3 using an atom force microscope.

The upper surface of the conductive carbon layer 3 has a surface resistance value of, for example, $1.0 \times 10^4 \Omega/\square$ or less, preferably $1.0 \times 10^3 \Omega/\square$ or less. The surface resistance value can be measured with a method with a four-probes method array in conformity with JIS K 7194.

The conductive carbon layer 3 has a thickness of, for example, 5 nm or more, more preferably 10 nm or more and, for example, 200 nm or less, more preferably 100 nm or less. When the thickness of the conductive carbon layer 3 is the above-described lower limit or more, the conductive carbon layer 3 has excellent film-forming properties and thus can develop stable electrode properties. On the other hand, when the thickness of the conductive carbon layer 3 is the above-described upper limit or less, the conductive carbon layer 3 can be thinned and has excellent flexibility and thus is given good handleability.

The thickness of the conductive carbon layer 3 can be calculated by the measurement of the X-ray reflectivity of the conductive carbon layer 3. The specific calculation will be described below in Examples.

The conductive carbon layer 3 can contain another additive agent in addition to carbon. The conductive carbon layer can consist of a plurality of layers each having a different structure, composition, and additive agent concentration. Alternatively, the conductive carbon layer 3 can have a structure in which, for example, the structure, composition, and additive agent concentration gradually change (in gradations).

4. Method of Fabricating the Carbon Electrode

The carbon electrode 1 is produced, for example, by a step of preparing the substrate 2, a step of providing the substrate 2 with a carbon thin film, and a step of an oxidation treatment of the carbon thin film.

First, a known or commercially available substrate 2 is prepared.

Thereafter, for the adhesion of the substrate 2 and the conductive carbon layer 3, as necessary, the upper surface of the substrate 2 can be subjected to a foundation process such as sputtering, a corona discharge, flames, ultraviolet light irradiation, electron beam irradiation, chemical conversion, or oxidation. Further, solvent cleaning or ultrasonic cleaning can be used to remove the dust and clean the substrate 2.

Next, the carbon thin film is provided on the upper surface of the substrate 2. Preferably, a dry process is used to form the conductive carbon layer 3 on the upper surface of the substrate 2.

Examples of the dry process include a PVD method (physical vapor deposition method) and a CVD method (chemical vapor deposition method). Preferably, a PVD method is used.

Examples of the PVD method include a sputtering technique, a vacuum deposition method, a laser deposition method, and an ion plating method (such as an arc deposition method). To reduce the hydrogen contained in the conductive carbon layer 3 and surely form the film of the conductive carbon layer 3, preferably, a sputtering technique is used.

Examples of the sputtering technique include an unbalanced magnetron sputtering technique (UBM sputtering technique), a high-power pulsed sputtering technique, an electron cyclotron resonance sputtering technique, an RF sputtering technique, a DC sputtering technique (DC magnetron sputtering technique), a DC pulsed sputtering technique, an ion beam sputtering technique, and an ECR sputtering technique (electron cyclotron resonance sputtering technique).

To easily form the film of the conductive carbon in a desired range of the ratio of spa bonds to $sp^2$ bonds, to improve the film deposition rate and the adhesion to the substrate, to simplify the device structure, and to increase the ion irradiation, more preferably, a UBM sputtering technique is used.

When a sputtering technique is used, the targeted material may be carbon (preferably, a sintered carbon). To adjust the film quality or stabilize the process, the targeted material may contain a known additive agent.

Examples of the sputtering gas introduced into the film deposition chamber include inert gases such as Ar and Xe. To sputter the conductive carbon layer 3, for example, an oxygen gas is not combined as a reactive gas.

The sputtering technique is carried out under vacuum. Specifically, to suppress the reduction in the sputtering rate and stabilize the electrical discharge, the atmospheric pressure at the sputtering is, for example, 1 Pa or less, preferably, 0.7 Pa or less.

The film deposition temperature (the substrate temperature) is, for example, 200° C. or less, preferably, 120° C. or less and, for example, −40° C. or more, preferably, 0° C. or more.

Further, to form the conductive carbon layer 3 with a desired thickness, for example, the conditions for the targeted material or the sputtering can appropriately be set and the sputtering technique can be carried out several times.

In this manner, an intermediate including the substrate 2 and the carbon thin film in the thickness direction is obtained.

Next, the carbon thin film of the intermediate is subjected to an oxidation treatment.

As the oxidation treatment, any method that increases the oxygen atoms existing on the upper surface of the carbon thin film can be used. Examples of the oxidation treatment include a plasma treatment, and an electrochemical treatment. To simplify the production, preferably, an electrochemical treatment is used.

In the electrochemical oxidation treatment, the intermediate is used as the working electrode for the electrochemical measurement. Then, a potential higher than the measurable potential limit (the maximum potential) is applied.

For example, when the anodic potential limit, to the silver/silver chloride reference electrode is 1.9 V at the oxidation side in the potential window (measurement range) of the electrochemical measurement, a potential (for example, 2.3 V or higher) substantially exceeding 1.9 V is applied.

The excessive potential is applied, for example, several times, specifically, twice or more, preferably, five times or more and, for example, 20 times or less.

In this manner, the oxygen concentration on the upper surface of the carbon thin film increases, and the conductive carbon layer 3 is formed. As a result, the carbon electrode 1 including the substrate 2 and the conductive carbon layer 3 in the thickness direction is obtained.

The carbon electrode 1 has a total thickness of, for example, 2 μm or more, preferably, 20 μm or more and, for example, 1000 μm or less, preferably 500 μm or less.

5. An Electrode for an Electrochemical Measurement and an Electrochemical Measurement System The carbon electrode 1 can be used as various electrodes and, preferably, used as the electrode (preferably, the working electrode) for an electrochemical measurement.

When the carbon electrode 1 is used as an electrode, an insulating layer patterned into a desired shape can be provided on the upper surface of the carbon electrode to adjust the exposed surface (electrode surface) of the conductive carbon layer 3. Alternatively, the carbon electrode 1 or the conductive carbon layer 3 can entirely be patterned into a desired shape. Examples of the insulating layer include the polymer film in the above description of the substrate 2.

Examples of the electrochemical measurement method include techniques for measuring the potential difference such as a potential difference measurement method, and techniques for measuring the current such as an electrical conductivity measurement method, amperometry, voltammetry, and an alternating-current impedance method.

In the electrochemical measurement system of the present invention, the carbon electrode 1 is used as the working electrode.

Figure 2:
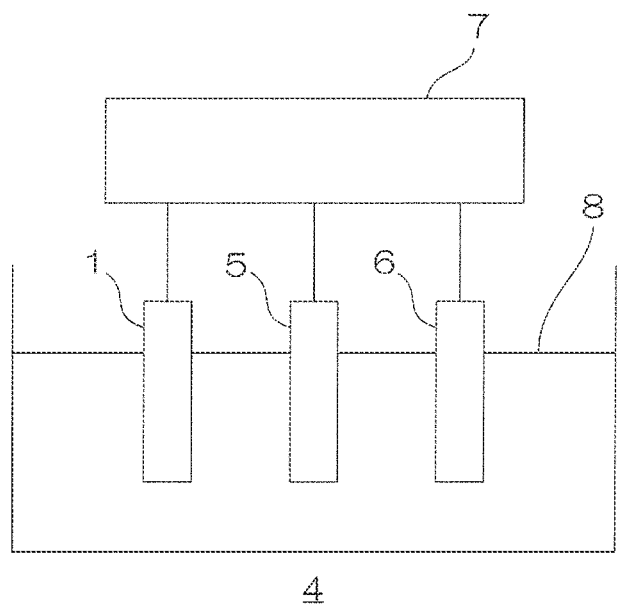
FIG. 2 is a schematic view of an electrochemical system using the electrode of FIG. 1.

Specifically, the electrochemical measurement system for a potential difference measurement technique includes the carbon electrode 1, a reference electrode, a potentiometer that measures the electromotive force between the electrodes, and an electrolytic solution. An electrochemical measurement system 4 for a current measurement technique includes, as illustrated in FIG. 2, the carbon electrode 1, a reference electrode 5, a counter electrode 6, a potentiostat 7 that controls the electrode potentials of the electrodes, an ammeter that measures the current flowing between the carbon electrode 1 and the counter electrode 6 (the ammeter is not illustrated because being incorporated in the potentiostat), and an electrolytic solution 8 (see FIG. 2).

Examples of the reference electrode 5 include a silver/silver chloride electrode, a saturated calomel electrode, and a standard hydrogen electrode. Examples of the counter electrode 6 include a platinum electrode, a gold electrode, and a nickel electrode. Examples of the electrolytic solution 8 include a phosphate buffered aqueous solution such as a sodium hydrogenphosphate aqueous solution, and a sulfuric acid aqueous solution.

When the threshold value of the current per unit area is 250 µA/cm$^2$ in the electrochemical measurement system 4, the anodic potential limit value of the potential window of, for example, the silver/silver chloride reference electrode is, for example, 1.8 V or more, preferably 1.9 V or more and, for example, 2.5 V or less. When the potential value is in the above-described range, compounds with a high potential such as uridylic acid, and inosine 5'-triphosphate can be detected.

Of the carbon electrode 1 and the electrochemical measurement system 4, the conductive carbon layer 3 has sp$^2$ bonds and sp$^3$ bonds, and the concentration ratio of oxygen to carbon is 0.07 or more on the upper surface (the one-side surface in the thickness direction) of the conductive carbon layer 3. Thus, the potential window extends for anodic direction. Hence, substances detected with high potential can be detected. For example, compounds such as uridylic acid, and inosine 5'-triphosphate can be detected.

Particularly, the ratio of the number of sp$^3$ bonded atoms to the sum of the number of sp$^3$ bonded atoms and the number of sp$^2$ bonded atoms is, 0.35 or more. Thus, when the concentration ratio of oxygen is 0.07 or more, namely, high, the extension of the potential window can be increased.

Especially, uridylic acid is included in RNA (such as uracil) as a partial structure. Thus, the electrochemical measurement 1 can be used to quantify RNA. On the other hand, inosine 5'-triphosphate is a phosphate adduct of inosine and inosine is an intermediate to be formed into adenine or damaged adenine (deaminated adenine). Thus, for example, the metabolic pathway and damage of adenine can be evaluated. Especially, dephosphorylation is not required, and inosine can be quantified. In addition, these uridylic acid and inosine relate to umami ingredients in foods, and thus can be used to analyze the foods.

The mechanism for extending the potential window when the above-described concentration ratio is high is inferred as follows. However, the present invention is not limited to the following inference. It is known that, in comparison between a graphite structure (sp$^2$ part) and a diamond structure (sp$^3$ part), the sp$^3$ bonded part has a wider potential window. Thus, it is presumed that, in the conductive carbon layer 3 having an sp$^2$ part and an sp$^3$ part, oxygen is introduced to the sp$^2$ part by the oxidation treatment, and the sp$^3$ part on the surface of the conductive carbon layer is relatively increased, and thus the potential window is extended. These are presumed to cause the ratio of the number of sp$^3$ bonded atoms to be 0.35 or higher.

6. Variations

The carbon electrode 1 illustrated in FIG. 1 consists of the substrate 2 and the conductive carbon layer 3. However, for example, although not illustrated, one or 2 or more function layer(s) can be included between the substrate 2 and the conductive carbon layer 3 or at a lower side of the substrate 2. Examples of the function layer include a gas barrier layer, a conductive layer, an adhesive layer, a surface smoothing layer, and a hard coating layer. The function layer includes particles with a median size of 1.0 nm or less, or does not include a particle. In this manner, the upper surface of the function layer can be a flat surface.

EXAMPLES

The present invention will be more specifically described below with reference to Examples and Comparison Example. The present invention is not limited to any of the Examples and Comparison Example. The specific numeral values used in the description below, such as mixing ratios (contents), physical property values, and parameters can be replaced with the corresponding mixing ratios (contents), physical property values, parameters in the above-described "DESCRIPTION OF EMBODIMENTS", including the upper limit values (numeral values defined with "or less", and "less than") or the lower limit values (numeral values defined with "or more", and "more than").

Example 1

A silicon substrate with a thickness of 300 µm was prepared. Using a UBM sputtering technique, a carbon layer with a thickness of 35 nm was formed on an upper surface of the silicon substrate. For the conditions of the sputtering technique, a sintered carbon was used as the targeted material, the argon gas pressure was 0.6 Pa, the target power was 400 W, and the substrate temperature was 120° C. or less. Meanwhile, a DC bias of 75 V was applied between the silicon substrate and the sintered carbon target (the targeted material). In this manner, a laminate including the substrate and the conductive carbon layer was produced.

The laminate as the working electrode, a silver/silver chloride electrode as the reference electrode, and a platinum electrode as the counter electrode were connected to a potentiostat (manufactured by BAS Inc., the trade name of "CHI 802"), and thereby fabricating an electrochemical measurement system. As an electrolytic solution, 50 mmol/L of a phosphate buffer solution (a mixture solution of 50 mmol/L of an NaH$_2$PO$_4$ aqueous solution and 50 mmol/L of an Na$_2$HPO$_4$ aqueous solution, pH 7) was used.

In the electrochemical measurement system, an applying potential of "0 V→2.3 V→0 V" was carried out 5 times to subject the surface of the laminate to an oxidation treatment, and thereafter the laminate was taken out. In this manner, a carbon electrode was produced.

Example 2

Except that the applying potential cycle was carried out 8 times, a carbon electrode was produced in the same manner as Example 1.

Example 3

Except that the applying potential cycle was carried out 15 times, a carbon electrode was produced in the same manner as Example 1.

Comparative Example 1

Except that the applying potential cycle was not carried out, a carbon electrode was produced in the same manner as Example 1.

Comparative Example 2

Except that an RF bias of 10 W was applied between the silicon substrate and the sintered carbon target (the targeted material) and the applying potential cycle was not carried out, a carbon electrode was produced in the same manner as Example 1.

Comparative Example 3

A carbon electrode was produced in the same manner as Example 1 except that the target power was changed from 400 W to 500 W, a DC bias was not applied between the silicon substrate and the sintered carbon target (the targeted material), and the applying potential cycle was not carried out. Thereafter, the surface of the electrode was subjected to UV irradiation by a UV/ozone device for 30 seconds while the distance between the UV lamp and the carbon electrode (the surface of the conductive carbon layer) was set to 5 mm, and thereby subjecting the conductive carbon layer to an oxidation treatment. Thereafter, the electrode was taken out. In this manner, the carbon electrode was produced.

Comparative Example 4

A carbon electrode was produced in the same manner as Example 1 except that a DC bias was not applied between the silicon substrate and the sintered carbon target (the targeted material), and the applying potential cycle was not carried out.

Comparative Example 5

Except that the applying potential cycle was not carried out and the surface was naturally oxidized, a carbon electrode was produced in the same manner as Comparative Example 4.

Comparative Example 6

Except that the target power was changed from 400 W to 300 W, the DC bias between the silicon substrate and the sintered carbon target (the targeted material) was changed from 75 V to 40 V, and the applying potential cycle was not carried out, a carbon electrode was produced in the same manner as Example 1.

Comparative Example 7

Except that the target power was changed from 500 W to 400 W, and the distance between the UV lamp and the carbon electrode (the surface of the conductive carbon layer) was set to 7 mm, a carbon electrode was produced in the same manner as Comparative Example 3.

Example 4

A carbon electrode was produced in the same manner as Example 1 except that the target power was changed from 400 W to 450 W, the DC bias between the silicon substrate and the sintered carbon target (the targeted material) was changed from 75 V to 50 V, and the applying potential cycle was not carried out.

Comparative Example 8

A carbon electrode was produced in the same manner as Example 1 except that the target power was changed from 400 W to 100 W, the DC bias between the silicon substrate and the sintered carbon target (the targeted material) was changed from 75 V to 100 V, and the applying potential cycle was not carried out.

Example 5

Except that the applying potential cycle was changed from "0 V→2.3 V→0 V" to "0 V→2.2 V→0 V", and the number of the times of the applying potential cycle was changed from 5 to 10, a carbon electrode was produced in the same manner as Comparative Example 8.

Example 6

Except that a PET substrate was used in place of the silicon substrate, a carbon electrode was produced in the same manner as Example 1.

Example 7

Except that a PET substrate was used in place of the silicon substrate and a hard coating layer with a thickness of 1.3 μm was disposed on the upper surface of the PET substrate, a laminate including the substrate, the hard coating layer, and the conductive carbon layer was produced in the same manner as Example 4. Subsequently, a carbon electrode was produced. The hard coating layer included particles with a median size of 15 nm.

(Measurement of the Surface Roughness)

The arithmetic meant surface roughness Ra of the upper surface of each of the conductive carbon layers were measured in a range of 500 nm×500 nm with an atomic force microscope (Digital Instruments, Inc., the trade name of "Nanoscope IV").

(Measurement of the Film Thickness)

Using X-ray reflectometry as the measurement principle, and a powder X ray diffractometer (manufactured by Rigaku Corporation, "RINT-2200"), under the following measurement conditions, the X-ray reflectivity was measured and the obtained measurement data was analyzed by an analytics software (manufactured by Rigaku Corporation, "GXRR3"), thereby calculating the film thickness. For the analysis, under the following <analysis conditions>, a two-layered model of an Si substrate and a two-layered model of the carbon film were used, and the targeted film thickness of the carbon film, the surface roughness of 0.5 nm, and the density of 1.95 g/cm$^3$ were input as initial values, and thereafter Least Square fitting with the measured values was carried out, thereby analyzing the film thickness of the carbon film. The results are shown in Table 1 and Table 2.

<Measurement Conditions>
  Measurement device: a powder X-ray diffractometer (manufactured by Rigaku Corporation, "RINT-2200")
  Light source: Cu-Kα rays (wavelength: 1,5418A), 40 kV, 40 mA
  Optical system: a parallel beam optical system
  Divergence slit: 0.05 mm
  Receiving slit: 0.05 mm
  Monochromatization-Paralellization: A multi-layered Goebel mirror was used.
  Measurement mode: θ/2θ scan mode
  Measurement range (2θ): 0.3-2.0°
<Analysis Conditions>
  Analytics software: manufactured by Rigaku Corporation, "GXRR3"
  Analysis technique: Least squares fitting
  Analysis range: (2θ):2θ=0.3–2.0°
  (Measurement of the concentration ratio of oxygen)
  (Measurement of sp$^3$ and sp$^2$)

Figure 3:
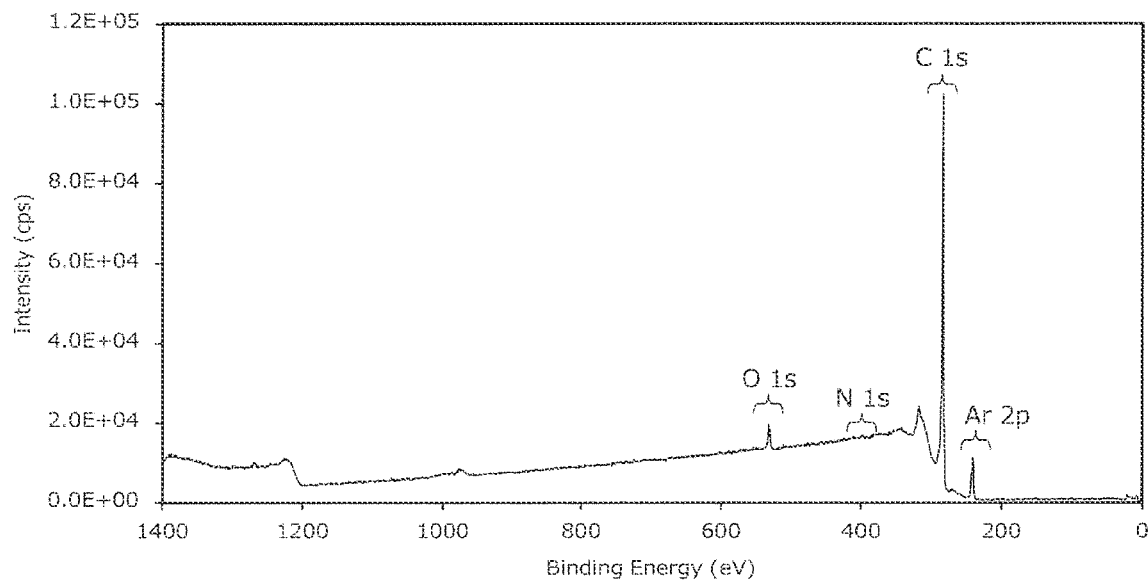
FIG. 3 is a view of a spectrum obtained by measuring the upper surface of the electrode of Example 1 with X-ray photoelectron spectroscopy (a wide scan analysis).
Figure 4:
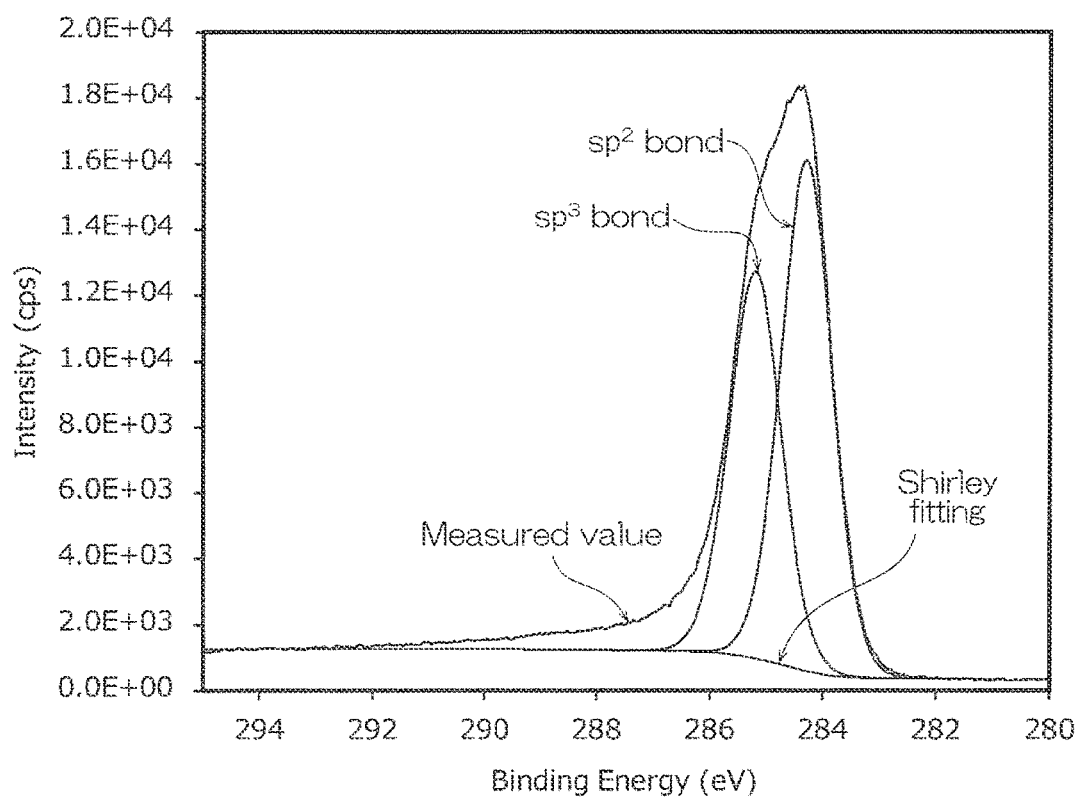
FIG. 4 is a view of the spectrum obtained by measuring the upper surface of the electrode of Example 1 with X-ray photoelectron spectroscopy (a narrow scan analysis).

The upper surface of each of the conductive carbon layers was subjected to X-ray photoelectron spectroscopy under the following <Measurement conditions>. From the spectrum graph obtained from the measurement (see FIG. 3 and FIG. 4), each peak area was obtained, thereby calculating the concentration ratio and the ratio of the number of carbon atoms. The concentration ratio (O/C) of oxygen to carbon is shown in Table 1 to Table 3. The ratio (sp$^3$/sp$^3$+sp$^2$) of the number of sp$^3$ bonded carbon atoms to the sum of the number of sp$^2$ bonded carbon atoms and the number of sp$^3$ bonded carbon atoms is summarized in Table 1 to Table 3.

<Measurement Conditions>
  Measurement device: X-Ray Photoelectron Spectrometer (XPS) (manufactured by Shimadzu Corporation, the trade name of "AXIS Nova")
  X-ray source: AlKα (1486.6 eV) with a diameter 500 mm Rowland monochromator, 15 kV, 10 mA
  Photoelectron spectrometer: orbital radius 165 mm, a combination of a static double hemispherical analyzer/a spherical mirror analyzer
  Detector: a delay line detector (DLD) system
  Energy resolution: Ag3d5/2 photoelectron peak is the full width at half maximum of 0.48 eV or less.
  Charge neutralization: homogeneous low-energy electron irradiation (Measurement of the Potential Window Properties)

An insulating tape having a hole with a diameter 2 mm was adhered to the upper surface of each of the conductive carbon layers of Examples 4-7 and Comparative Examples 1-7, and the carbon electrode had an electrode area of 3.14 mm$^2$.

The carbon electrode as the working electrode, the silver/silver chloride electrode as the reference electrode, the platinum electrode as the counter electrode were connected to the potentiostat (described above), thereby fabricating the electrochemical measurement system of each of Examples and Comparative Examples. As the electrolytic solution, 50 mmol/L of a sulfuric acid aqueous solution was used.

A potential in a range between −2.4 V and +2.4 V was applied to the reference electrode of each of the electrochemical measurement systems at a scan rate of 0.1 V/s. The potential range in which the current value obtained in the potential application is between −500 μA/cm$^2$ and +500 μA/cm$^2$ was defined as the range of the potential window. The anodic potential limit is summarized in Table 1 and Table 2.

(Ruthenium Complexes Activity)

The electrode activities of the Ru complexes of Examples 1 to 3 were evaluated as ΔEp values. The results are summarized in Table 1. In the Table, the lower the ΔEp value is, the higher the the electrode activity is.

TABLE 1

| | | Conductive carbon layer | | | | Potential window (V) [Anodic Potential limit] | UMP Evaluation | ITP Evaluation |
|---|---|---|---|---|---|---|---|---|
| | Substrate | O/C ratio | $\frac{sp^3}{sp^3 + sp^2}$ | Film thickness (nm) | Surface roughness Ra (nm) | | | |
| Example 1 | Silicon | 0.09 | 0.40 | 35 | 0.9 | 1.95 | Good | Good |
| Example 2 | | 0.09 | 0.40 | 5 | 0.8 | 1.94 | Good | Good |
| Example 3 | | 0.10 | 0.40 | 35 | 0.9 | 1.95 | Good | Good |
| Comp. Ex. 1 | | 0.03 | 0.40 | 35 | 0.9 | 1.73 | Bad | Bad |

TABLE 2

| | Substrate | O/C ratio | $\frac{sp^3}{sp^3 + sp^2}$ | Potential window (V) [Anodic Potential limit] | First sample/ Second sample |
|---|---|---|---|---|---|
| Comp. Ex. 2 | Silicon | 0.03 | 0.21 | 1.98 | Second sample |
| Comp. Ex. 3 | Silicon | 0.07 | 0.20 | 1.89 | First sample |
| Comp. Ex. 4 | Silicon | 0.03 | 0.23 | 2.02 | Second sample |
| Comp. Ex. 5 | Silicon | 0.08 | 0.22 | 2.02 | First sample |
| Comp. Ex. 6 | Silicon | 0.03 | 0.30 | 1.93 | Second sample |
| Comp. Ex. 7 | Silicon | 0.07 | 0.30 | 1.96 | First sample |
| Comp. Ex. 8 | Silicon | 0.03 | 0.41 | 2.06 | Second sample |
| Example 4 | Silicon | 0.08 | 0.40 | 2.32 | First sample |
| Comp. Ex. 9 | Silicon | 0.03 | 0.50 | 2.22 | Second sample |
| Example 5 | Silicon | 0.08 | 0.63 | 2.34 | First sample |

TABLE 3

|  | Substrate | O/C ratio | $\frac{sp^3}{sp^3+sp^2}$ | Ruthenium complex activity $\Delta$ Ep (V) |
|---|---|---|---|---|
| Example 6 | Silicon | 0.08 | 0.48 | 79 |
| Example 7 |  | 0.08 | 0.49 | 79 |
| Example 8 |  | 0.10 | 0.53 | 85 |

While the illustrative embodiments of the present invention are provided in the above description, such is for illustrative purpose only and it is not to be construed as limiting in any manner Modification and variation of the present invention that will be obvious to those skilled in the art is to be covered by the following claims.

INDUSTRIAL APPLICABILITY

The electrode is included, for example, in an electrochemical measurement system.

DESCRIPTION OF REFERENCE NUMERALS 1 carbon electrode
2 substrate
3 conductive carbon layer
4 electrochemical measurement system
5 reference electrode
6 counter electrode
7 potentiostat
8 electrolytic solution
Ra surface roughness of the upper surface of the conductive carbon layer

The invention claimed is:

1. An electrode comprising:
   a substrate; and
   a conductive carbon layer disposed at one side in a thickness direction of the substrate and having an $sp^2$ bond and an $sp^3$ bond, wherein
   a concentration ratio of oxygen to carbon is 0.07 or more on a one-side surface in the thickness direction of the conductive carbon layer,
   a ratio of $sp^3$ bonded carbon atoms to a sum of $sp^2$ bonded carbon atoms and the $sp^3$ bonded carbon atoms is 0.35 or more, and
   the substrate is an organic substrate.

2. The electrode according to claim 1, wherein the conductive carbon layer has a thickness of 5 nm or more and 200 nm or less.

3. The electrode according to claim 1, wherein the one-side surface in the thickness direction of the conductive carbon layer has a surface roughness Ra of 1.0 nm or less.

4. The electrode according to claim 1, being an electrode for an electrochemical measurement.

5. An electrochemical measurement system comprising the electrode according to claim 4.

* * * * *